United States Patent Office 3,262,759
Patented July 26, 1966

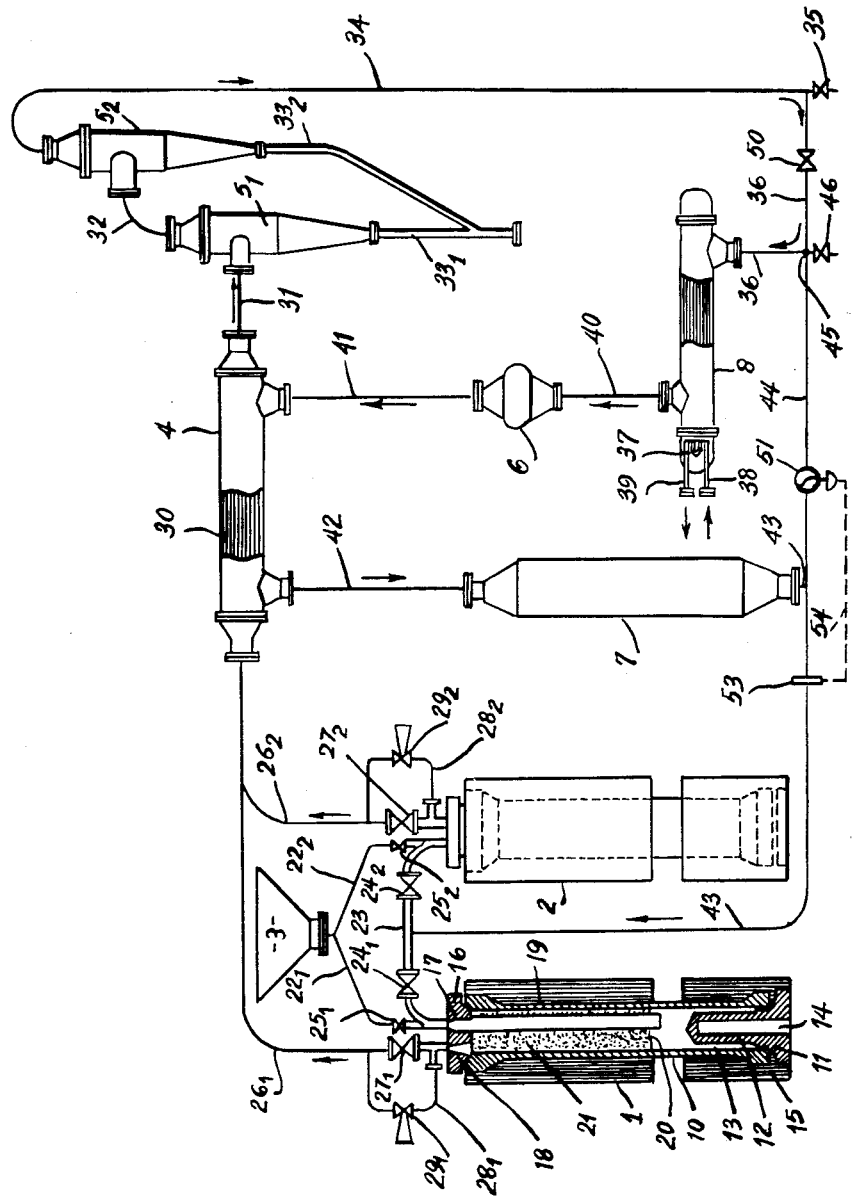

3,262,759
APPARATUS FOR CARRYING OUT CHEMICAL REACTIONS UNDER PRESSURE
Jean Louis Emile Pomot, Neuilly, Seine, Emmanuel Jean Francois Luzarreta, Toulouse, Haute-Garonne, and Robert Leon Pierre Becanne, Pinsaguel, Haute-Garonne, France, assignors to Office National Industriel de l'Azote, Toulouse, Haute-Garonne, France, a French body corporate
Filed Feb. 8, 1963, Ser. No. 257,311
Claims priority, application France, June 1, 1959, 796,232, Patent 1,267,160; Apr. 20, 1960, 824,832, Patent 77,543
10 Claims. (Cl. 23—290)

This application is a continuation-in-part of our U.S. patent application Serial No. 31,410, now Patent No. 3,111,519 for the production of melamine by heating a mixture consisting of urea and cyanuric acid in the proportion of three molecules of urea to one molecule of cyanuric acid at a temperature between 300° and 350° C. in a closed vessel.

In one aspect, the invention consists in a pressure vessel comprising a substantially vertical tube the base of which is provided with a central vertical protuberance extending into the lower end of the tube so as to form therewith an annular reaction zone whose thickness is small in comparison with its mean diameter, and means for heating the said reaction zone. Suitably the vessel may be of soft steel, provided when necessary with a corrosion resistant lining. The ratio between the diameter of the vertical protuberance and the inner diameter of the substantially vertical tube is preferably not less than ⅔ and in particular may be of the range from ⅔ to 19/20.

In another aspect the invention consists in apparatus comprising in circuit at least two pressure vessels as described above arranged in parallel and provided with shut-off valves whereby each of the vessels can be cut off from communication with the remainder of the circuit at will, a heat exchanger for gases, a device for separating solid particles from a gas containing them, a cooler, a gas circulating means and a heater, all arranged in order such that gaseous effluent from one of the pressure vessels passes through the heat exchanger to the separator from which the gas freed from solid particles passes through the cooler, the gas circulating means, the other side of the heat exchanger, and the heater, back to the same or another of the pressure vessels. The separating device may usefully comprise a cyclone or two or more cyclones in series. This apparatus is particularly suitable for working the process of specification No. 31,410 on a semi-continuous basis.

In the preferred form of the pressure vessel of the invention the central vertical protuberance is hollow and adapted to contain either heating means or heat insulating material. It is also advantageous to provide in the upper part of the vessel obstacles designed to provide a large surface for condensation, and also with means whereby the said upper part can be kept at an elevated temperature different from that of the lower part of the vessel. The obstacles may be fixed to the inner wall of this part of the vessel, for example in the form of partitions, fine or similar surface irregularities. It is however more convenient from the industrial viewpoint to make these obstacles separate from the inner wall, for example in the form of packing bodies such as clips or Raschig rings held in position by a foraminous or perforated support. Another useful expedient is to provide an obstacle in the form of a coiled tube for the passage of a heat-transfer fluid, either in place of or as well as packing bodies. The obstacles are preferably made of a material which is a good conductor of heat. This material must naturally be resistant to chemical attack by the reactants or reaction products, and when the apparatus is to be used for the production of melamine as described above they may usefully be of silver or graphite. Silver may then with advantage be employed as a lining for the autoclaves.

The invention is illustrated in the accompanying drawing, in which the single figure is a diagram, partly in section, of the apparatus.

The apparatus is shown as comprising only two identical autoclaves 1 and 2.

The essential part of the autoclave 1 consists of a force tube 10 that is to say, a thick tubular member whose height is large in relation to its internal diameter, in the present instance at least four times, and advantageously eight times, the said diameter. The tube 10 may be a conventional tube of forged steel internally lined with metal which is resistant to corrosion under the operating conditions, more especially a plate silver sheet. It is alternatively possible, although this is less recommended, to make the tube of one of the commercial alloys having a low iron content which are resistant to corrosion.

The tube 10 is closed at the bottom by a plate 11 comprising a cylindrical portion 12 which projects within the tube 10 so as to define, with the lower part of the tube, an annular chamber 13 of small thickness in relation to its mean diameter and which receives the charge of cyanuric acid and urea. The plate 11 and its cylindrical portion 12 are preferably formed with a cavity 14 which is either filled with thermal insulation, such as diatomaceous earth, or contains an additional heating device.

Along the length of the annular chamber 13, the tube 10 is surrounded by a heating device 15 intended to bring the charge to the reaction temperature. The said heating device is preferably an electric induction heating device. Alternatively, an electric resistance heating device or a device for heating by means of a heat-carrying fluid, for example a liquid (thermofluid) or a gas (superheated gas or fumes), may be provided.

The tube 10 is closed at the top by a cover 16 formed with an inlet orifice 17 and an outlet orifice 18, the first orifice carrying a tube 19 for the introduction of the charge, which tube penetrates through the force tube 10 into the neighbourhood of the annular chamber 13.

The end plate 11 and its cylindrical portion 12, the cover 16 and the tube 19 are of similar construction to the force tube 10 for the purpose of protection against corrosion, as hereinbefore explained.

The force tube 10 comprises above the lower end of the introduction tube 19 a transverse foraminous or perforated partition 20 for maintaining a charge of filling bodies 21 which occupies the entire height of the tube 10 above the partition.

Disposed above the autoclaves 1 and 2 is a grain feeding device, diagrammatically shown as a hopper 3 comprising pipes $22_1$, $22_2$ leading into the autoclaves 1, 2 respectively. The pipes $22_1$ and $22_2$ open into a gas pipe 23 connecting the orifice 17 of the autoclave 1 with the corresponding orifice of the autoclave 2, shut-off valves $24_1$, $24_2$ being provided in the pipe 23 in the neighbourhood of the autoclaves, while valve $25_1$, $25_2$ are provided in the pipes $22_1$, $22_2$.

Extending from the outlet orifices of the autoclaves (orifice 18 in the case of the autoclave 1) are gas ducts $26_1$, $26_2$, which merge together and lead to a heat exchanger and which contain main valves $27_1$, $27_2$. Disposed on either side of the latter are branches $28_1$, $28_2$ containing gas discharge valves $29_1$, $29_2$ of smaller cross-sectional area than the main valves $27_1$, $27_2$.

The heat exchanger 4 may be of any appropriate type. It is here shown as a cluster of tubes 30 connected to the pipes $26_1$, $26_2$, so that the effluent coming from the said pipes flows through the interior of the said cluster of tubes. On the opposite side, the tubes 30 open into a pipe 31 leading to a device for separating gas and solid particles. Any appropriate separating device may be provided. That shown in the drawing consists of a battery of two cyclones $5_1$, $5_2$ connected in series by a pipe 32 for the passage of gaseous suspension, their outlet collectors being provided with descending pipes $33_1$, $33_2$, which merge together, and at the bottom of which the separated melamine is collected.

Extending from the second cyclone $5_2$ is a gas discharge pipeline which comprises a shut-off valve 35 and leads, downstream of the latter, to an installation for the recovery of ammonia (not shown). Branched from the upstream side of the shut-off valve 35 is a gas return duct 36 comprising a shut-off valve 50 and leading to a cooler 8, which may be a heat exchanger of any type for the transfer of heat to a cooling fluid. As illustrated, the cooler contains a tubular coil 37 with an inlet 38 and outlet 39 for a cooling fluid. Extending from the outlet of the cooler 8 is a gas duct 40 leading to the inlet of a gas circulating device 6, for example a blower, the outlet of which is connected by a duct 41 to the heat exchanger 4 so as to lead the gas into the intertubular space thereof.

Extending from the heat exchanger 4 is a duct 42 leading to the inlet of a heater 7 of any appropriate type for raising the temperature of the gas coming from the heat exchanger. A duct 43 extends from the outlet of the heater 7 to the pipe 23.

A communication pipe 44 is provided between the duct 43 and the duct 36 (downstream of the valve 50), while there is branched from the said communicating duct a pipe 45 for the supply of inert gas, with a shut-off valve 46.

Disposed in the pipe 44 is a butterfly valve 51 and in the duct 43, beyond the point at which the latter is connected to the pipe 44, a diaphragm device 53 responding to the gas flow passing therethrough, the diaphragm being connected to the valve 51 so as to open the latter when the flow exceeds a certain value and thus to permit an excess volume of gas leaving the heater 7 to be taken up by the blower 6. When the valves $24_1$ and $24_2$ are both closed, the valve 51 is opened in order to avoid stopping the blower 6.

The operation of this apparatus will now be described by reference to its use in the process of specification N°. 31,410.

With the valves $24_1$, $27_1$, $29_1$ and $25_2$ closed, the valve $25_1$ is opened for introducing into the autoclave 1 grains comprising the reactants coming from the feed device at a predetermined charge rate between 100 and 150 kg., preferably 120 kg., per cubic metre of autoclave. The first charge may be introduced into a cold autoclave, but subsequently, in the course of production, each charge is introduced immediately after the entrainment, by means of hot inert gas, of the melamine formed in the proceeding operation.

The valve $25_1$ is then closed and the lower part of the autoclave is brought by means of the heating device 15 to a temperature between 300° and 400° C., preferably between 320° and 380° C., while the temperature of the upper part is maintained between 225° and 275° C., preferably in the neighbourhood of 250° C.

After completion of the reaction, at the end of the time hereinbefore indicated, the valve $29_1$ of small cross-section is opened, without stopping the heating, in order to discharge the gas and to bring the pressure in the autoclave 1 substantially to atmospheric. The gases, consisting essentially of a mixture of carbon dioxide and ammonia together with a little melamine entrained by the expansion, are admitted through the pipe $26_1$ into the tubes 30 of the heat exchanger.

The gases are successively fed through the pipe 31 to the cyclones $5_1$ and $5_2$, in which they are freed from small quantities of entrained melamine. From there, the gases are directed through the duct 34 beyond the valve 35, which is open while the valve 50 is closed, to the installation for the recovery of ammonia.

When the pressure in the autoclave 1 has reached atmospheric pressure, the valves $24_1$, $27_1$ and 50 and if desired the valve 46 for the intake of inert gas are opened, and the valve 35 is closed in order that there may be set up, with the blower in operation, an inert gas circuit extending successively through the intertubular chamber of the heat exchanger 4, the heater 7, the upper part of the autoclave 1, the tubes 30 of the heat exchanger 4, the cyclones $5_1$, $5_2$ and the cooler 8. The inert gas is preferably nitrogen. The heating in the heater 7 is so adjusted that the inert gas is brought to a temperature between 290° and 350° C., preferably to the neighbourhood of 320° C. The blower 6 is designed to provide a flow of from 30 to 50 cubic metres (reckoned at 0° C. and 760 mm. Hg) per hour per kg. of melamine to be entrained by sublimation. For example, it is calculated that with a mean rate of flow of 4000 cubic metres per hour and with an autoclave capable of producing 100 kg. of melamine per charge, the sublimation is complete in about 30 minutes.

In the heat exchanger 4, the inert gas coming from the blower 6 flows in counter-current to the hotter gas leaving the autoclave 1 and it is thus brought to a temperature of about 250° C. The heater 7 is so adjusted as thereafter to raise the temperature of the gas to about 320° C.

In passing through the tubes 30 of the heat exchanger 4, the gas charged with melamine vapours is cooled to about 130° C., and the melamine is separated therefrom in the solid state in the cyclones $5_1$, $5_2$.

In the cooler 8, the temperature of the gas is lowered to a value compatible with satisfactory operation of the blower 6. With the blowers now on the market, this temperature can be fixed in the range from 75° to 100° C.

The autoclave 2 operates under the same conditions as the autoclave 1, but it is in the gas extraction and sublimation phase while the autoclave 1 is in the charging and reaction phase.

The apparatus described can operate entirely automatically by servo-control of the various valves, the charging and reaction phase in the above-described example having to be of exactly the same duration as the gas extraction and sublimation phase.

If, for example, it is desired to reduce the temperature of the entrainment gas, whereby the sublimation phase is lengthened, it may be necessary to provide one or more additional autoclaves connected in parallel with the previously mentioned autoclaves so as to balance the various phases of the cycle.

An apparatus operating in a semi-continuous cycle as hereinbefore described is capable of producing from 1000 to 1250 kg. of melamine per useful cubic metre of autoclave every 24 hours. For example, if the autoclaves 1 and 2 each have a capacity of 1 cubic metre, the apparatus will produce from 2 to 2.5 tons of melamine every 24 hours.

The sublimed crude product has a purity equal to or higher than 98%, and it is completely water-soluble and has no parasitic colouration, notably when the metal employed for lining the autoclaves is silver.

It will thus be understood that for physical or chemical conversion of substances in solid phase, at elevated temperature and pressure, we provide a reaction vessel comprising a first zone which is arranged for a very quick heat transfer from the vessel wall to the substance or substances to be converted, the ratio between the outer surface and the volume of said zone being very high, and a second zone maintained at a lower temperature than the first zone and in which means are provided for condensation thereon of the vapours of the conversion product from the first zone, said second zone having an inlet and an outlet for a hot gas stream effective to vaporize and entrain said conversion product condensed on said means.

What we claim is:

1. An apparatus for the conversion of at least one substance under elevated temperature and pressure into a conversion product which is vaporized at said elevated temperature and pressure and condensable to solid at said elevated pressure under a lower elevated temperature, which comprises a closed vessel having a pressure-resisting wall, a valved gas inlet and a valved gas outlet through said wall in the upper part thereof, means for maintaining the lower part of said vessel at said first-named elevated temperature, means for maintaining the upper part of said vessel at said lower, elevated temperature, means located in the lower part of said vessel forming with said walls of said vessel a generally uniformly annular reaction zone, the last said means having a generally cylindrical configuration and being positioned in said lower part concentrically with respect to the walls of said vessel and also extending upwardly within the lower portion of said vessel to substantially the same height of the portion thereof which is maintained at said elevated temperature for conversion of reactants, obstructing means supported from said vessel wall within the upper part of said vessel for condensation thereon of the vapors of said conversion product to solid, and means for passing a hot gas from said inlet to said outlet via said upper part of said vessel to vaporize and entrain said conversion product condensed on said obstructing means.

2. A pressure reaction vessel comprising a substantially vertical tube, means for heating the lower portion of said tube to an elevated conversion temperature, closure means positioned in the bottom end of said tube, said closure means having thereon a protuberance extending upwardly into said vessel to substantially the same height of the portion thereof which is maintained at said elevated temperature for conversion of reactants and also concentrically relative to the tube side walls, said protuberance together with said side walls thus forming an annular reaction zone in the lower portion of said tube; means for closing said tube at the top thereof having an inlet for reactants and an outlet for reaction products therein; an obstructing means positioned within the upper part of said tube above said reaction zone providing a condensation zone, and means for maintaining the upper part of the said vessel at a temperature lower than the reaction temperature of said reaction zone.

3. The pressure reaction vessel of claim 2, said protuberance being hollow.

4. A reaction vessel as claimed in claim 2 wherein a guiding tube is connected to said outlet extending downwardly into said vessel to a point below said condensation zone, thereby permitting the introduction of reactants, scavenging gases and the like below the last said zone.

5. The pressure reaction vessel as claimed in claim 2 wherein the said obstructing means comprises an apertured transverse partition secured in the upper part of said tube at a level between the top of said protuberance and the top of said tube, said partition having thereon a charge of packing bodies providing additional vapor condensation surfaces.

6. A pressure reaction vessel as defined in claim 2 wherein the ratio between the diameter of said protuberance and the inner diameter of said tube is at least equal to 2/3.

7. The pressure reaction vessel of claim 2, said protuberance being hollow and containing a heat-insulating material.

8. The pressure reaction vessel of claim 2, said protuberance being provided with heating means.

9. An apparatus which comprises at least two pressure reaction vessels arranged in parallel, each being provided with valve and conduit means leading to a source of supply of reaction materials, and each said vessel being provided with outlet conduit means leading therefrom to heat exchange means, said heat exchange means having a discharge conduit connecting with means for separating solids suspended in gases; a gas cooling device connected to the outlet side of said separating means; gas circulating means connected to the outlet side of the gas cooling device; said circulating means being connected to said heat exchange means and delivering cooled gas thereto; heating means connected to the outlet side of said heat exchanger, said heating means delivering heated gas to conduit means, said conduit means being connected to each of said pressure vessels by way of separately valved gas delivery tubes; each pressure reaction vessel comprising a substantially vertical pressure-resisting tube having a base provided with a central vertical protuberance extending into the lower end of said tube, forming therewith an annular reaction zone, means for heating the said reaction zone, means for heating the upper part of said tube to a different temperature and means for feeding reactants in a non-gaseous phase to said annular reaction zone.

10. The apparatus of claim 9, said separating device comprising at least one cyclone.

References Cited by the Examiner

UNITED STATES PATENTS 2,319,508    5/1943    Leprestre et al. _____ 23—288 X

MORRIS O. WOLK, *Primary Examiner.*

JAMES H. TAYMAN, JR., *Examiner.*